United States Patent [19]

Abraham

[11] Patent Number: 4,712,441

[45] Date of Patent: Dec. 15, 1987

[54] POSITION CONTROLLED LINEAR ACTUATOR

[75] Inventor: William F. Abraham, Lancaster, N.Y.

[73] Assignee: Brunswick Valve & Control, Inc., Houston, Tex.

[21] Appl. No.: 733,633

[22] Filed: May 13, 1985

[51] Int. Cl.⁴ .............................................. F16H 25/20
[52] U.S. Cl. .............................. 74/89.15; 74/424.8 R; 74/412 TA
[58] Field of Search ..................... 74/89.15, 424.8 R; 308/3 R, 3 A

[56] References Cited

U.S. PATENT DOCUMENTS

| | | | |
|---|---|---|---|
| 1,122,409 | 12/1914 | Mumford | 308/3 R |
| 1,263,934 | 4/1918 | Robinson et al. | 308/3 R |
| 2,369,986 | 2/1945 | Schaefer | 318/473 |
| 2,441,505 | 5/1948 | Ochtman | 74/424.8 R |
| 2,660,281 | 11/1953 | Ochtman | 74/424.5 |
| 3,029,660 | 4/1962 | Sears | 74/424.8 R |
| 3,209,090 | 9/1965 | Fry | 200/47 |
| 3,463,891 | 8/1969 | Fry | 74/527 |
| 3,480,746 | 11/1969 | Fry | 200/47 |
| 3,504,555 | 4/1970 | Fry | 74/89.15 |
| 3,529,104 | 9/1970 | Angle | 200/47 |
| 3,862,595 | 1/1975 | Longo | 308/3 A |
| 3,894,232 | 7/1975 | Laspesa | 74/89.15 |
| 4,019,616 | 4/1977 | Thorne | 74/424.8 R |
| 4,078,440 | 3/1978 | Dalton et al. | 74/89.15 |
| 4,137,784 | 2/1979 | Griffin | 74/89.15 |
| 4,307,799 | 12/1981 | Zouzoulas | 200/47 |
| 4,328,885 | 5/1982 | Zouzoulas | 74/435 |
| 4,334,649 | 6/1982 | Dooley | 74/89.15 |
| 4,442,390 | 4/1984 | Davis | 74/89 |
| 4,515,415 | 5/1985 | Szenger | 308/3 R |

Primary Examiner—Lawrence Staab
Attorney, Agent, or Firm—Lowe, Price, LeBlanc, Becker & Shur

[57] ABSTRACT

A linear actuator includes an electric drive motor which is connected to a drive screw through a gear train. Rotation of the drive screw causes a drive nut to move axially in order to impart axial motion to an extension member. Limit switches function to disengage power to the electric motor upon the extension member reaching the outer or inner limits of its stroke. Also, a thermal sensing element located in the windings of the electric motor interrupts power to the motor upon the heat up of the motor windings above a predetermined temperature, as when the drive nut jams or locks-up. A sealed housing contains the drive screw, drive nut and extension to protect against entry of dust. The housing has reaction surfaces which cooperate with the drive nut to permit linear movement of the nut while holding the nut against rotation.

26 Claims, 13 Drawing Figures

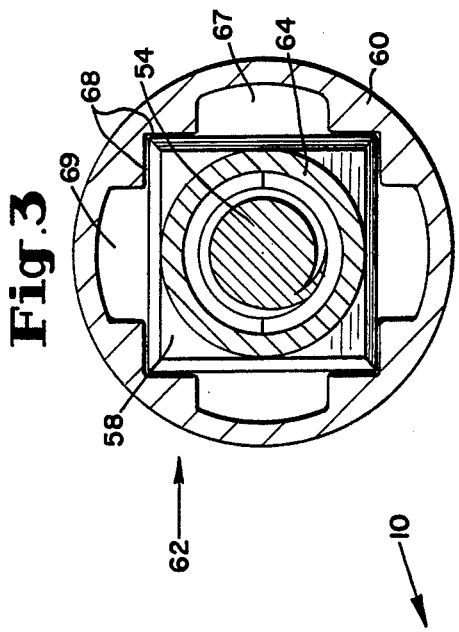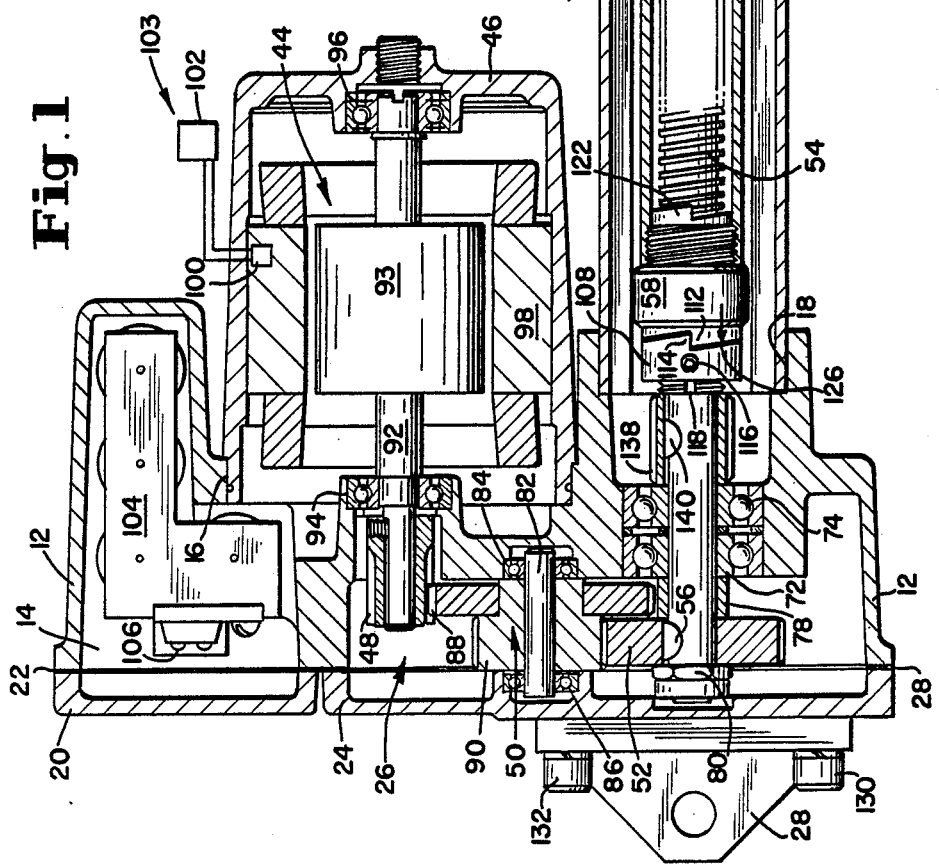

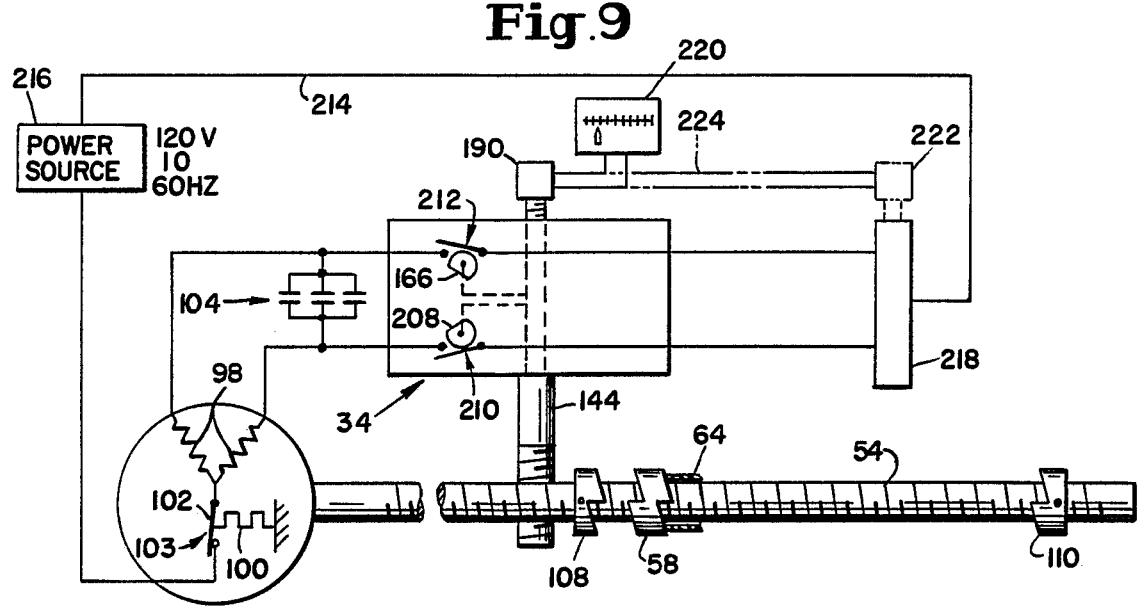
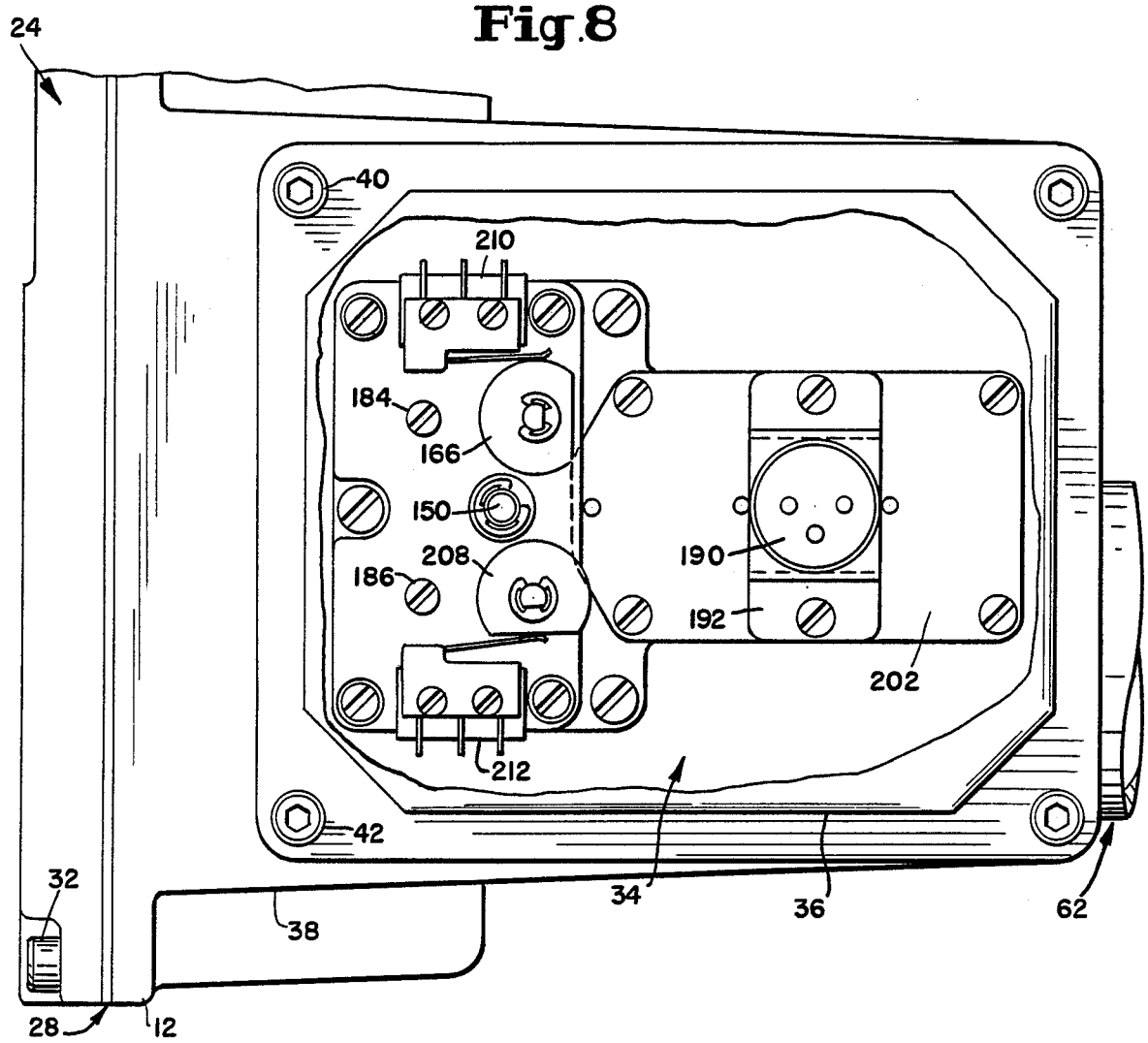

POSITION CONTROLLED LINEAR ACTUATOR

BACKGROUND OF THE INVENTION

The present invention relates to a linear actuator which is provided with a first level of position control and a second level of position and overload control.

Linear actuators are typically utilized in situations where a thrust force is used for applying linear motion. Examples of the utilization of such thrust force is in the operation of level arms, cranks, slides and valve levers in industrial equipment. Such actuators are utilized for alternatively moving objects between predetermined positional limits. The actuators can be utilized for moving the moveable member between positions within such predetermined limits by the utilization of appropriate feedback means.

Linear actuators usually include an electric drive motor which is connected to a drive screw through a drive means which utilizes either a gear train or a drive belt. Rotation of the drive screw by the electric motor causes a drive nut to move axially in order to impart axial motion to a connection extension rod. For unattended automatic operation of linear actuators it is necessary to provide a control means for disengaging the electric motor at the outer and inner limits of the extension rod stroke. Various arrangements many of which include microswitches have been utilized for this purpose.

U.S. Pat. No. 4,328,885 to Zouzoulas which is assigned to the common assignee hereof describes an actuator activated switching mechanism which provides for control of an electric motor depending upon the position of the actuator. Other control means for actuators are shown in U.S. Pat No. 2,441,505 to Ochtman; U.S. Pat. Nos. 3,209,090, 3,463,891, 3,480,746 and 3,504,555 all to Fry; and U.S. Pat. No. 3,529,104 to Angle.

For some applications it has been deemed preferable to employ an overload thrust disengagement control means so that blockage of the movement of the extendable member will not result in breakage of the actuator components. U.S. Pat. No. 4,307,799 to Zouzoulas provides a thrust control mechanism 41 for this purpose. Another type of overload control is the utilization of a slip clutch such as shown in U.S. Pat. No. 2,660,281 to Ochtman. These types of thrust control mechanisms and overload controllers are expensive to manufacture and often encounter internal breakage which then renders them unsuitable for their intended function of preventing further damage to the actuator.

Another feature of linear actuators is that various internally fitted rods or splines have been utilized to prevent rotation of specially designed drive nuts which are moved axially by rotation of the drive screws. U.S. Pat. No. 4,307,799 to Zouzoulas illustrates a drive nut 26 which is designed to be restrained against rotational motion by four guide rods 30. U.S. Pat. No. 4,137,784 to Griffin shows the use of an internal spline or protrusion 52 for preventing rotation of the drive nut 30. The use of such rods and splines or protrusions requires the special machining of drive nuts as well as the use of complicated internal components.

Another problem present in the prior art is that many of the linear actuator housings were not sealed against the incursion of dust in the industrial environments in which they are utilized. The absence of sealed housings then results in either the electric motor or the linear actuator extension rod becoming fouled and inoperative.

SUMMARY OF THE INVENTION

A linear actuator is provided with a combination of improved features which includes a first level of positional control and a second level of position and overload control. A first control means is provided for disengaging the power from the drive motor at either of the two terminal limits of the actuator stroke. A second control means is provided for disengaging the power from the drive motor when an overload thrust condition is encountered either at the two terminal position limits of the actuator movement or at any intermediate position between these two limits. Each of the control means is independently functional to provide for the setting of different positional limits and for different thrust overload control.

The first positional control means is comprised of a simplified limit switch assembly which functions to disengage power to the electric motor upon the extendable member reaching the outer or inner limits of its stroke.

The second control means is comprised of an overload controller means which includes a thermal sensing element located in the windings of the electric drive motor. This latter controller means operates to interrupt power to the electric motor upon the heat up of the motor windings above a predetermined temperature.

Front and back stops are preferably provided for physically limiting the motion of the drive nut without jamming or lock-up of the actuator stroke mechanism. Continued application of power once the drive nut engages either the front or back stops causes the overload controller means to disengage power to the electric motor.

In addition, the linear actuator is provided with a positional sensing and indicating means in order to monitor the axial position of the extendable member of the linear actuator. The position of the extendable member can also be visually displayed or recorded if desired.

The linear actuator is provided with an improved body tube assembly within which are positioned the drive screw and drive nut, the latter of which can be a standard square sided nut.

It is therefore an object of the present invention to provide a linear actuator having, in combination, a series of improved features.

Another object of the present invention is to provide a linear actuator with a first level of position control for controlling the operations between predetermined position limits and with a second level of position and overload control for controlling the actuator operation within predetermined force thrust limits.

Another object is to provide front and back stops for the drive nut which limit the nut movement without jamming the actuator stroke mechanism.

Yet another object of the present invention is to provide a linear actuator with a simplified body tube assembly which permits the use of standard available drive nuts.

Still a further object is to provide a linear actuator having a sealing housing containing the drive screw, drive nut and extension member so that the housing can be protected against entry of dust.

A still further object is to provide a linear actuator of compact configuration in which the axes of the drive screw and the electric motor are arranged in parallel.

Yet another object of the present invention is to provide a linear actuator which is characterized by low unit manufacturing costs.

Another object of the present invention is to provide a method of operating a linear actuator having two levels of positional and overload control.

The above-noted objectives are achieved by the construction of a linear actuator in accordance with the present invention. The actuator is formed with a compact body housing which provides for the acceptance of an electric motor housing and a body tube assembly within which the drive screw and drive nut are contained. The axes of the electric motor and the drive screw are arranged in parallel on the same side of the body housing. In order to utilize a low cost single phase reversible motor a capacitor subassembly and housing therefor are also provided in an interfitting relationship with the main actuator body housing.

The rotor of the electric motor rotates a drive pinion gear which meshes with an intermediate speed reduction gear which in turn is in mesh with a main drive gear which is keyed to one end of the drive screw by a Woodruff key. The drive screw is journaled within the main body housing by a pair of angular contact bearings and at the outer end of the body tube assembly by a nonferrous screw guide bearing. Rotational motion from the electric motor is transmitted through the drive pinion gear, intermediate gear and the main gear to the drive screw. The drive pinion gear, intermediate gear and the main gear then comprise the drive means of the linear actuator.

A drive nut is in threaded engagement with the drive screw and is moved axially with respect to the drive screw since it is prevented from rotating by reaction surfaces which are configured into the inner surfaces of the body tube assembly. An extension rod is attached to the outermost surface of the drive nut and is axially moved along with the drive nut by rotation of the drive screw within the body tube assembly. A nonferrous bushing end cap is provided between the outer end of the body tube assembly and the extension rod outer surface. This arrangement functions as the actuator stroke mechanism.

A portion of the drive screw is fitted with cross helical gearing which operates a limit switch pinion gear. This gear is in turn connected to a drive shaft which operates a limit switch assembly drive gear in order to power first and second sets of counter gears which in turn operate limit switches for de-energizing the electric motor at the inner and outer limits of the axial stroke of the extension rod. A position sensing and/or indicating means is also operated by rotation of the limit switch drive gear and is utilized to produce an electric signal proportional to the linear position of the extension rod. This signal can be utilized as a feedback control for limiting and interrupting the input power to the electric motor at predetermined positions and/or for displaying the axial position of the extension rod on an indicator device.

Preferably, front and back stops can be provided on the drive screw to engage portions of a specially configured drive nut in order to prevent the binding of the actuator stroke mechanism.

A load connector is attached to the outer end of the extension rod for coupling the linear actuator to a load.

Preferably a clevis bracket can be attached to the main body housing of the actuator to provide for a pivotal connection to a reaction support surface. Alternatively, a trunnion fixture can be attached to the outer end of the body tube assembly also to provide for a pivotal connection to a support reaction surface.

The internal surfaces of the body tube assembly can be preferably configured to accept and provide for reaction support for a square sided drive nut. Also, if desired, a body tube assembly having a substantially square cross-sectional opening can be employed. In either embodiment openings between the drive nut and the internal walls of the body tube assembly can be employed for permitting the passage of lubricant.

These and other objects of the present invention will become apparent from a description of the following drawings.

BRIEF DESCRIPTION OF THE DRAWINGS

FIG. 1 is a cross-sectional view of the preferred embodiment of the linear actuator of the present invention;

FIG. 3 is a cross-sectional view of the body tube assembly of the actuator shown in FIG. 1 taken on line 3—3;

FIG. 8 is an external side elevation view of the limit switch assembly corresponding to the operational elevation view of FIG. 6;

FIG. 9 is a schematic diagram of the two levels of positional and overload control circuitry for the present invention;

DESCRIPTION OF THE PREFERRED EMBODIMENT

Figure 4:
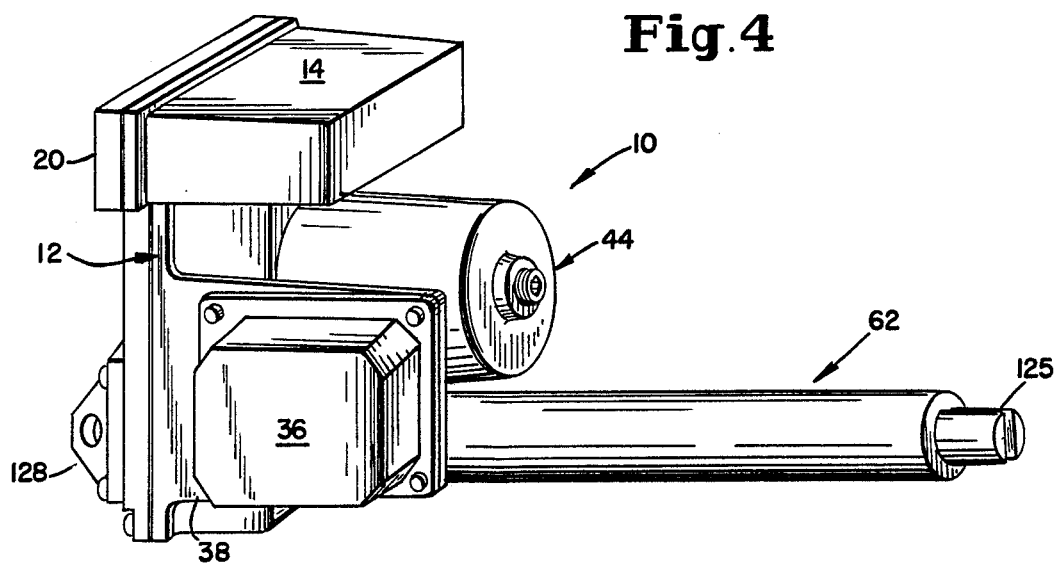
FIG. 4 is an external perspective view of the linear actuator shown in FIGS. 1-3.

FIGS. 1-9 show the linear actuator 10 of the present invention with a body housing 12 formed with an upper compartment 14, an intermediate motor casing opening 16, and a body tube opening 18 at the lower end thereof. The upper compartment 14 is closed by a cover plate 20 which is sealed to the body housing 12 by a cover gasket 22. A gear compartment face plate 24 is provided for sealing the drive gear mechanism 26 within the body housing 12. A face plate gasket 28 is provided for this purpose. Suitable socket head screws illustrated as 30 and 32 are provided to secure the cover plate 20 and face plate 24 to the body housing 12.

Figure 2:
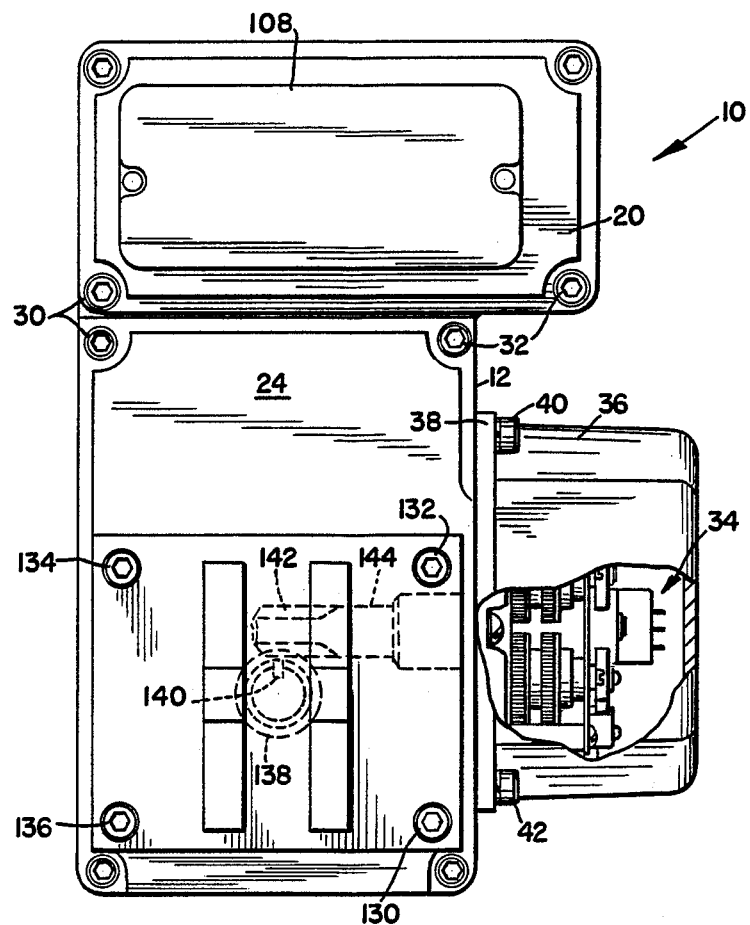
FIG. 2 is an end elevation view of the actuator shown in FIG. 1.

FIG. 2 shows a limit switch assembly 34 retained on the side of actuator 10 under a cover 36 which is secured to a body housing mounting plate 38 by socket head cap screws 40 and 42.

The internal operation of the linear actuator 10 is shown in FIG. 1, wherein electric drive motor 44 which is retained within motor casing 46 provides rotary power to a drive pinion gear 48 which in turn transmits power through an intermediate gear 50 to the main drive gear 52 which is journaled to the end of the drive screw 54 by a Woodruff key 56. Rotation of drive screw 54 moves the drive nut 58 axially within the body tube 60. The body tube assembly 62 is formed by the external body tube 60 which is fitted into opening 18 in housing 12, the internal drive screw 54, the drive nut 58 and an extension rod 64 which is affixed to the outer side of drive nut 58 so as to extend beyond the outer end 66 of the body tube assembly 62. The drive nut 58 is secured against rotation by reaction surfaces such as 68 shown in FIG. 3 which are formed internally within the body tube 60 with openings 67 and 69 formed at 90° thereto. This pattern is symmetrical to the body tube assembly cross-section. Extruded aluminum tubing can be used for the body tube 60. Drive nut 58 is shown to be a square sided nut in the preferred FIG. 3. Drive screw 54 is shown coaxially centered within the extension rod 64.

Extension rod 64 is thus axially extendable beyond the end 66 of the body tube assembly 62. This extension rod 64 is secured at the outer end of the body tube assembly 62 by an end cap 70 which is formed from a nonferrous metal which then acts as a bushing and a seal. p The driven end of drive screw 54 is supported by a pair of angular contact bearings 72 and 74 which are supported within a bearing opening 76 within body housing 12. A main gear spacer 78 is provided between the main drive gear 52 and the two bearings 72 and 74. The main drive gear is secured to the end of the drive screw 54 by a flex nut 80. The intermediate gear 50 is retained on a dowel pin 82 which is journaled between bearings 84 and 86. This intermediate gear 50 has an outer teeth set 88 for contacting the drive pinion gear 48 and an inner set 90 for contact with the main drive gear 52.

The motor drive shaft 92 connected to a rotor core 93 is supported by a front bearing 94 within body housing 12 and at the outer end by a bearing 96 which is retained in the motor casing 46. The motor stator 98 is secured within motor casing 46 and is provided with a thermal sensing element 100 which together with a switch 102 forms an overload controller means 103 shown schematically. The thermal sensing element 100 can indirectly control the switch 102 as shown. Also the thermal sensing element 100 and switch 102 can preferably be combined into a single bimetallic switch such as disclosed in U.S. Pat. No. 3,219,856 to Dunwiddie et al. The control of motor 44 by the overload controller means 102 is further described below.

Motor casing 44 is sealed within opening 16 in housing 12 by an o-ring 103.

A capacitor subassembly 104 is provided within compartment 14 in order to provide for change of phase between the windings in motor 44 to effect the instant reversal of direction of rotation. Motor 44 is preferably a single phase motor and is connected to the capacitor subassembly by a connection terminal 106 as shown. The drive pinion gear, intermediate gear and the main gear then comprise the drive means of the linear actuator. If desired, a name plate 108 such as shown on the compartment cover 20 in FIG. 2 can be utilized.

OPERATION OF LINEAR ACTUATOR 10

During operation of the axial movement of extension rod 64 between the terminal stroke limits the electric drive motor 44 is utilized to provide rotational power through the drive gear mechanism 26 so that rotational power is delivered to drive screw 54. The limit switch assembly 34, described in detail below can be set so that power to the electric drive motor 44 is interrupted just prior to the drive nut 58 reaching either of the two terminal positions which limit its stroke. In the event that the limit switches fail, the drive nut 58 will come into contact with either the back stop 108 or the front stop 110. Mating back stop reaction shoulder portion 112 is provided on drive nut 58 to provide a complementary abutment to the reaction shoulder 114 on the back stop 108. Back top 108 is secured to the inner end of drive screw 54 by a set screw 116 which rests in a mounting slot 118. A similar reaction shoulder 120 is provided for front stop 110 for coaction with a mating reaction shoulder portion 122 secured to the front face of drive nut 58. Both the back stop 108 and the front stop 110 are secured to and rotate with the drive screw 54. A retaining flux nut 124 is provided for retaining front stop 110.

The abutment shoulders 114 and 120 and the shoulder portions 112 and 122 on the drive nut 58 thus function to restrain the movement of drive nut 58 relative to drive screw 54 so that the actuator stroke mechanism which is provided by the body tube assembly 62 is not jammed at the ends of the extension rod stroke when the power to the drive motor 44 has not been interrupted by the limit switch assembly 34.

In such an event, as illustrated in FIG. 1, the drive nut 58 will come into abutment contact with the back stop 108 with a safety gap 126 remaining between the abutment shoulder extension 112 and the back stop 108. Continued operation of drive motor 44 will cause the stator coils 98 to heat up beyond the predetermined temperature which is sensed by the thermal element 100. The overload controller means 103 then operates to disengage the electric power supply to motor 44.

In the event that the extension rod 64 is prevented from movement during the axial movement of drive nut 58 this same overheating of the motor stator winding will occur which will then result in the electric power being interrupted from the drive motor 44. Thus the overload control means 103 functions both at the terminal limits of the axial movement of extension rod 64 as well as within those limits in the event of an overload thrust condition.

The extension rod 64 is fitted with a load connector 125 which has internal threads 127 for connecting with a load (not shown). A clevis bracket 128 is shown in FIGS. 1 and 2 on the opposite end of the linear actuator to provide a pivotal connection to a reaction support surface. The clevis bracket 128 is secured to the gear compartment face plate 24 by socket head cap screws 130 and 132 which are balanced by a corresponding cap screw pair 134 and 136 as shown in FIG. 2.

OPERATION OF LIMIT SWITCH ASSEMBLY

The limit switch assembly 34 is operated through rotary motion taken off from the drive screw 54 at a position between the back stop 108 and the pair of angular contact bearings 72 and 74 as shown in FIG. 1. Cross helical gearing teeth 138 are secured to this intermediate portion of drive screw 54 by a Woodruff key 140. A limit switch pinion gear 142 then mates with the cross helical gearing teeth to provide for rotation in either direction as shown in FIG. 2. The limit switch power shaft 144 thus provides rotational power to the limit switching assembly 34 wherein a main switch gear 46 is rotated.

The limit switch assembly 34 shown in FIGS. 2 and 5-8 is formed with a base plate 148 through which the drive shaft 144 extends. The drive gear 146 is mounted for axial movement with respect to the drive shaft 144 through force exerted on push button 150. A compression spring 152 is mounted between the drive gear 146 and a retainer flange 154 for this purpose. The push button 150 has a retainer washer 156 mounted at the outer end thereof for retaining a second compression spring 158 between the washer 156 and a cover plate 160. The inner portion of push button 150 then rests against the outer portion of drive gear 146 so that it can be moved out of contact with the bottom gears of the two counter gear sets 164 and 165 as illustrated by bottom gear 162 of set 164 in FIG. 5. A rotatable cam 166 is positioned above cover plate 160 and is journaled on the outer end of the cam drive shaft 168 which is rotatably fitted into base plate 148. Rotational power from the bottom gear 162 of the counter gear set 164 is transmitted to the bottom idler gear 170 of the cam gear set 172 which in turn powers the top gear 174 of the counter gear set 164. The top teeth set of the upper gear 174 then powers the drive gear 176 which rotates the cam 166.

Figure 6:
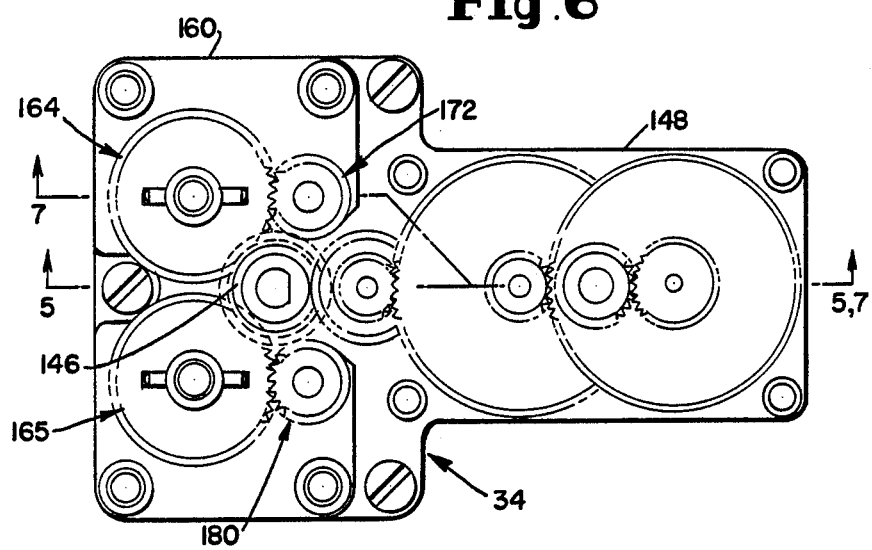
FIG. 6 is a side elevation internal view showing the gear structure within the limit switch assembly of FIG. 5.

FIG. 6 shows a side view of the limit switch assembly 34 in which the counter gear set 164 and the cam gear set 172 are shown in juxtaposition. A second counter gear set 165 and a second cam gear set 180 are also provided for similar operation by the limit switch drive gear 146.

Figure 7:
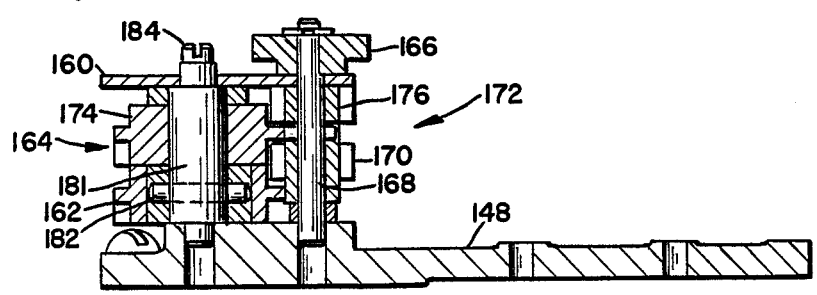
FIG. 7 is a detailed cross-sectional view of one of the counter gear sets and the associated cam gear set arranged internally within the limit gear assembly shown in FIGS. 5 and 6.

Adjustment of the limit switch positional switching is provided by depressing push button 150 to disengage the drive gear 146 from the lower gears of the two counter gear sets 164 and 165. The bottom counter gears can then be rotated by utilizing a screw driver for adjustment as shown in FIG. 7. The bottom gears of each counter gear set are pinned against rotation relative to core 181 by a pin 182. The adjustment fittings 184 and 186 are provided for each of the two counter gear sets 164 and 165 respectively, as shown in FIG. 8.

Figure 5:
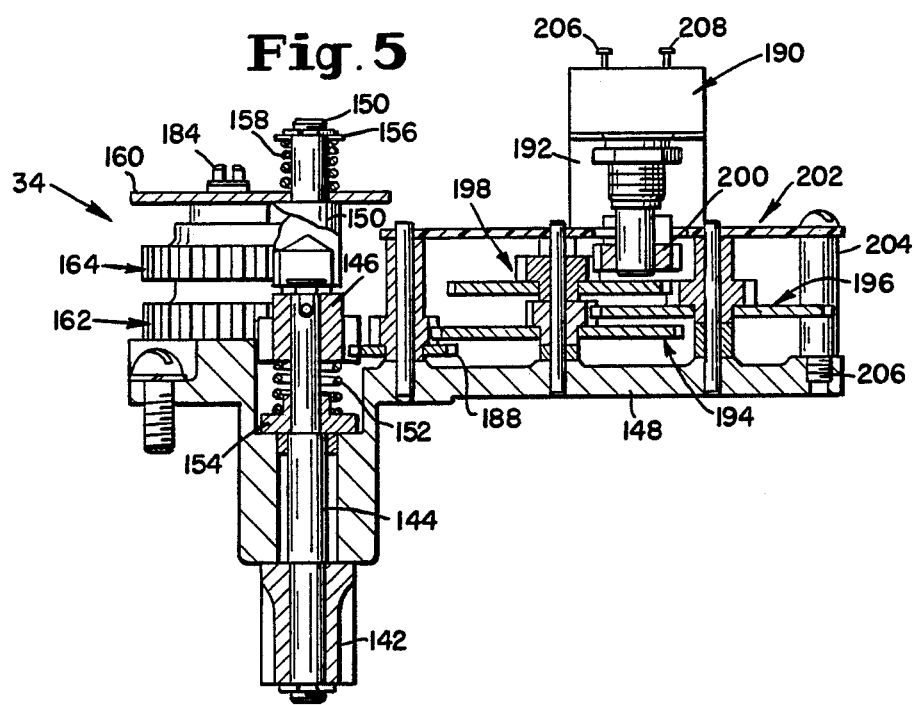
FIG. 5 is a detailed cross-sectional view of the limit switch assembly of the present invention.

Also as shown in FIG. 5 the drive gear 146 rotates an idler gear 188 which is utilized to provide rotational power to a potentiometer 190 which is mounted on a potentiometer bracket 192. The idler gear 188 rotates a speed reduction gear 194 which in turn operates a second intermediate reduction gear 196 and then a third speed reduction gear 198 which rotates the input potentiometer gear 200. The potentiometer bracket 192 is supported above the base plate 148 by a spaced mounted plate 202 which is retained by spacers 204 and screws 206.

The electrical signal generated by potentiometer 190 is connected by terminals 206 and 208 to either a control circuit or a position indicator as further described below. As shown in FIGS. 6 and 8 the switching cam 166 is operated by the cam gear set 172 while switching cam 208 is operated by cam gear set 180. The limit switches 210 and 212 are also shown connected to the top surface of face plate 160 for operational control by cams 166 and 208, respectively. The operation of the limit switch assembly 34 for controlling the power input to drive motor 44 is further described with respect to FIG. 9 below.

TWO LEVEL POSITIONAL AND OVERLOAD CONTROL OPERATION

FIG. 9 shows schematically the operation of a first level of positional control of drive nut 58 by the limit switch assembly 34 through operation of the limit switches 210 and 212 by reason of rotation of limit switch drive shaft 144 from the drive screw 54. The switching cam operators 166 and 208 can be adjusted for setting different positional limits for the operation of drive nut 58 as above described with respect to the counter gear sets 164 and 165.

A second level of position control is provided by the back stop 108 and the front stop 110 which function to stop the axial movement of drive nut 58 when the abutment shoulders come into contact as above described with respect to FIG. 1. Upon this physical motion limitation occurring the thermal element 100 in the stator windings 98 senses the temperature rise in the stator windings due to the electrical power which is supplied to the stator 98 as the drive shaft 54 is stopped from its motion. When the thermal sensing element 100 reaches the predetermined temperature the overload controller means 103 operates to interrupt the electric power flowing in power line 214 which is in turn powered by an external source 216. In this manner the second level of position control acts as a redundant backup system for disengaging the drive motor 44 from the external power source 216 in the event that either one of the two limit switches 210 or 212 fails. Power line 214 is connected to a power distributor 218 which can be either manually or automatically controlled to supply power to the limit switch assembly 34 for convenient start/stop functions.

The control system shown in FIG. 9 also provides a third position control means through utilization of the positional indicating signal generated by potentiometer 190 which is normally employed to provide a visual indication of the drive nut position on an indicator 220. The output signal from potentiometer 190 can alternately be utilized to control an electronic controller unit 222 through the optional lines 224 both shown in phantom. The controller unit 222 then automatically controls the power distributor 218 to disengage the power flow to the limit switches 210 and 212 at preselected axial positions of the actuator extension rod 64. In this manner a third level of power disengagement for power line 214 can be provided if desired.

Also shown in FIG. 9 is the capacitor subassembly 104 with the capacitor shown arranged in parallel for use in reversal of the motor 44. Standard motor reversal circuitry is provided through the capacitor subassembly 104.

In the event that drive nut 58 is restrained against axial movement by some external force other than coming to rest against the front or back stops 108 and 110 the motor stator winding 98 will begin to heat up in the fashion above described. This will then cause thermal sensing element 100 to open the power switch 102 to effect a shut down of the linear actuator 10. This event would then indicate some mechanical stoppage in the lever arm, crank, or slide to which the extendable rod 64 is connected.

ALTERNATIVE EMBODIMENTS

Figure 10:
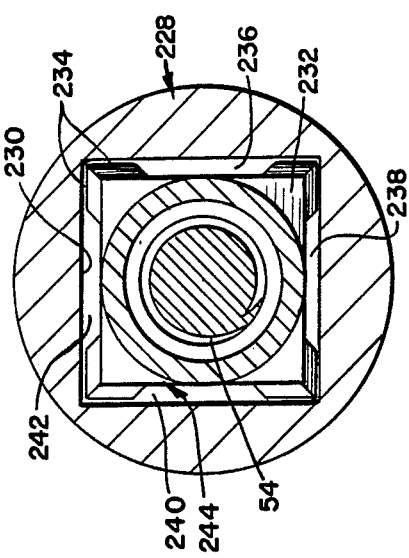
FIG. 10 is a cross-sectional view of a second embodiment of the body tube assembly of the present invention.

The drive nut and body tube described above can be modified as shown in FIG. 10 wherein a body tube 228 is configured with a substantially square axial internal opening 230 for accepting a configured drive nut 232 which is positioned on the threads of drive screw 54 as shown with respect to FIG. 3 above. In this modification the drive nut 232 is configured to have raised corner portions 234 for contacting the inner walls of the square opening 230. These raised corner portions then provide openings 236, 238, 240 and 242 along each of the four sides of the drive nut. These openings provide for the passage of lubricant when the body tube assembly 62 as shown in FIGS. 1 and 2 is filled with such a lubricant. These openings are similar to the configured openings 67 and 69 in the preferred embodiment illustrated in FIG. 3.

Figure 11:
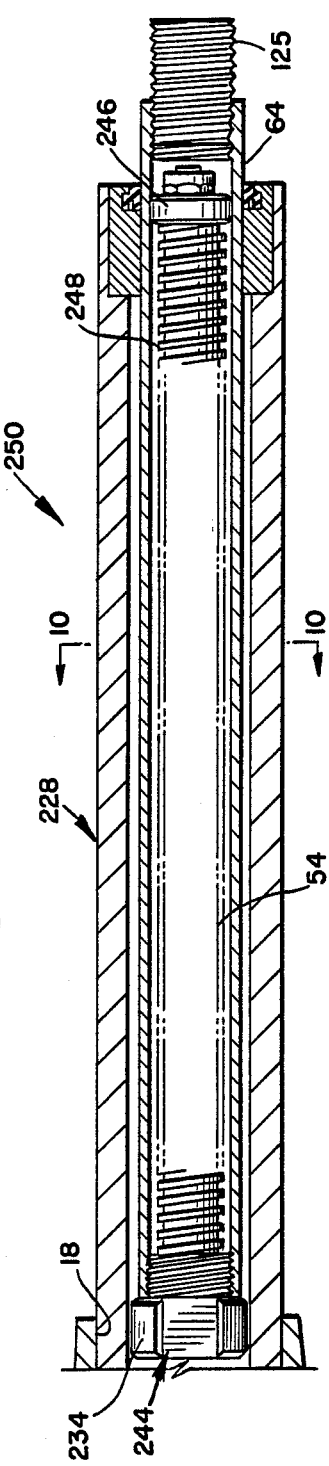
FIG. 11 is a cross-sectional longitudinal view of a second modification of the body tube assembly of the present invention.

Another embodiment is to eliminate the front and back stops 108 and 110 and to provide a drive nut without abutment shoulders such as illustrated in FIG. 11. In this modification a square sided nut 244 such as shown in he FIG. 3 cross-section can be preferably used together with an extruded, internally configured body tube; however a square opening through the body tube 228 is shown to correlate with the FIG. 10 cross-section. A nonferrous screw drive washer bearing 246 can also be provided to reduce machining costs. This bearing 246 provides support for the drive screw 248. The other components of the body tube assembly 250 are as above described. In this modification the drive nut will be forced into contact with other internal members within the body tube assembly which can have the effect of jamming the actuator stroke mechanism. This type of arrangement however has manufacturing simplicity and provides for a lower cost actuator which is preferable in certain circumstances.

Figure 13:
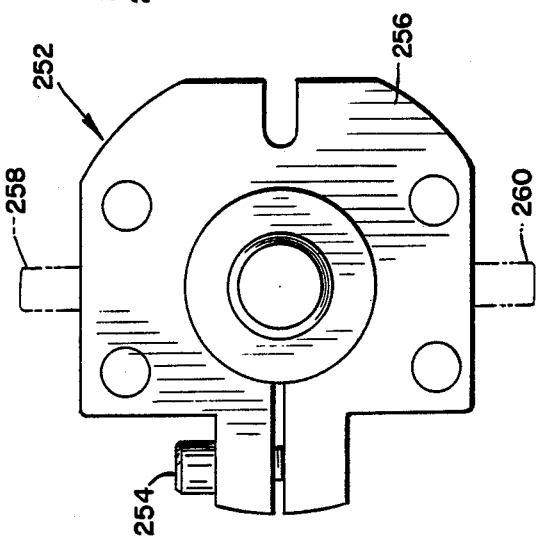
FIG. 13 is an end elevation view of trunnion flange shown in FIG. 12.
Figure 12:
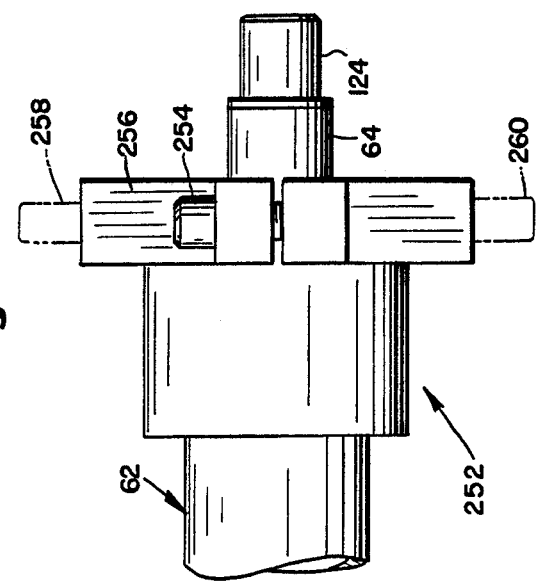
FIG. 12 is a side elevation view of a mounting trunnion flange for use with the linear actuator of the present invention.

Another embodiment is to replace the clevis bracket 128 shown in FIGS. 1 and 2 with a trunnion flange 252 such as is shown in FIGS. 12 and 13. The trunnion flange is configured to fit about the outer end 66 of the body tube assembly 62 by a socket head cap screw 254 which clamps the flange 256 about the end of the body tube assembly 62. Top and bottom pivot studs 258 and 260 are secured by flange 256 to provide for a pivotal connection to an exterior reaction surface in much the same manner as provided by the clevis bracket 128.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A linear actuator comprising:
   a housing;
   a drive screw rotatably supported within said housing;
   a drive nut in threaded engagement with said drive screw;
   a body tube assembly connected to said housing and positioned about said drive screw, said body tube assembly containing reaction surfaces for preventing rotation of said drive nut;
   an extendable member having a load connecting member on its free end and having the opposite end thereof connected to a drive nut, said extendable member adapted for axial movement so as to extend out of said body tube;
   drive means including an electric drive motor containing windings for rotating said drive screw;
   a limit switch assembly attached to said housing and adapted for operation by movement of said drive means, said switch assembly controlling operation of electrical power switches for disengaging said electric drive motor when said extendable member reaches predetermined positions, and said limit switch assembly containing a position monitoring means operated by said drive means adapted for generating an electrical signal proportional to the position of said extendable member; and
   an overload controller means having a thermal sensing element located in the winding of said electric motor, said controller means operable for interrupting power to said electric motor upon heat up of said motor windings beyond a predetermined temperature, and wherein a back stop means is attached to the inner end of said drive screw and a mating back stop reaction means is provided on the innermost portion of said drive nut, and wherein a front stop means is attached to said drive screw at its outer end and a mating front stop reaction means is provided on the outer portion of said drive nut, said front and back stop means preventing further axial motion of said drive nut to heat up said motor windings and interrupt power to said drive motor through operation of said overload controller means; said back stop means and mating back stop reaction means and said front stop means and mating front stop reaction means each being structured to have a safety gap formed axially therebetween to prevent jamming between the drive nut and the front or back stop means, the interior surfaces of said body tube assembly and the exterior surfaces of said drive nut configured to provide said reaction surfaces within said body tube assembly at least at corner portions of said drive nut and to provide open spaces between the outer surfaces of said drive nut and the interior surfaces of said body tube assembly other than at said reaction surfaces, substantially each corner portion having plural surfaces engaging corresponding reaction surfaces of the body tube assembly.

2. A linear actuator according to claim 1, wherein a first level of position control for said extendable member between set point positions is provided by operation of said limit switch assembly, and wherein a second level of position control in an overload mode is established by said overload controller means whereby operation of said linear actuator within its positional limits between the set point positions is controlled by said limit switch assembly and wherein the second level of position control is provided by said overload controller means.

3. A linear actuator according to claim 1, wherein said reaction surfaces within said body tube assembly engage said drive nut at corner portions thereof.

4. A linear actuator according to claim 3, wherein said body tube assembly is configured to provide open spaces between the outer surfaces of said drive nut and the interior surfaces of said body tube assembly except for said corner portions of said drive nut.

5. A linear actuator according to claim 1, wherein said limit switch assembly comprises a first and a second set of counter gears which are arranged for rotation by rotational movement of said drive means, and wherein said electrical power switches are arranged for operation by said first and second set of counter gears.

6. A linear actuator according to claim 1, wherein said position indicating means is adapted for operation by rotational movement of said drive means and comprises a potentiometer.

7. A linear actuator according to claim 1, wherein tthe axes of said extendable member and said electric motor are arranged in parallel.

8. A linear actuator according to claim 1, wherein said drive means comprises a drive pinion gear attached to the rotor of said electric motor, an intermediate gear and a main drive gear attached to the inner end of said drive screw.

9. A linear actuator according to claim 1, wherein a clevis bracket is attached to said housing for providing a pivotal reaction connection.

10. A linear actuator according to claim 1, wherein an external controlled circuit is provided for operation of said electric motor, and wherein the output signal from said position indicating means is operable through said controlled circuit to disengage electrical power from said electric motor at predetermined axial positions of said extendable member.

11. A linear actuator according to claim 1, wherein a motor housing is provided for said electric motor and wherein said motor housing and said actuator housing are sealed against entry of dust.

12. A linear actuator comprising:
a housing;
a drive screw rotatably supported within said housing;
a drive nut in threaded engagement with said drive screw;
a body tube assembly connected to said housing and positioned about said drive screw, said body tube assembly containing reaction surfaces for preventing rotation of said drive nut;
an extendable member having a load connecting member on its free end and having the opposite end connected to said drive nut, said extendable member adapted for axial movement so as to extend out of said body tube;
drive means including an electric drive motor containing windings for rotating said drive screw; and
an overload controller means having a thermal sensing element located in the windings of said electric motor, said controller means operable for interrupting power to said electric motor upon heat up of said motor windings beyond a predetermined temperature, and wherein a back stop means is attached to the inner end of said drive screw and a mating back stop reaction means is provided on the innermost portion of said drive nut, and wherein a front stop means is attached to said drive screw at its outer end and a mating front stop reaction means is provided on the outer portion of said drive nut, said front and back stop means preventing further axial motion of said drive nut to heat up said motor windings and interrupt power to said drive motor through operation of said overload controller means; said back stop means and mating back stop reaction means and said front stop means and mating front stop reaction means each being structured to have a safety gap formed axially therebetween to prevent jamming between the drive nut and the front or back stop means, the interior surfaces of said body tube assembly and the exterior surfaces of said drive nut configured to provide said reaction surfaces within said body tube assembly at least at corner portions of said drive nut and to provide open spaces between the outer surfaces of said drive nut and the interior surfaces of said body tube assembly other than at said reaction surfaces, substantially each corner portion having plural surfaces engaging corresponding reaction surfaces of the body tube assembly.

13. A linear actuator according to claim 12, wherein said reaction surfaces within said body tube assembly engage said drive nut at corner portions thereof.

14. A linear actuator according to claim 13, wherein said body tube assembly is configured to provide open spaces between the outer surfaces of said drive nut and the interior surfaces of said body tube assembly except for said corner portions of said drive nut.

15. A linear actuator according to claim 12, wherein the axes of said extendable member and said electric motor are arranged in parallel.

16. A linear actuator according to claim 12, wherein said drive means comprises a drive pinion gear attached to the rotor of said electric motor, an intermediate gear and a main drive gear which is attached to the inner end of said drive screw.

17. A linear actuator according to claim 12, wherein a clevis bracket is attached to said housing for providing a pivotal reaction connection.

18. A linear actuator according to claim 12, wherein a trunnion flange is attached to said body tube for providing a pivotal reaction connection.

19. A linear actuator according to claim 12, wherein a motor housing is provided for said electric motor and wherein said motor housing and said actuator housing are sealed against entry of dust.

20. A linear actuator comprising:
a housing;
a drive screw rotatably supported within said housing;
a drive nut in threaded engagement with said drive screw;
a body tube assembly connected to said housing and positioned about said drive screw, said body tube assembly containing reaction surfaces for preventing rotation of said drive nut;
an extendable member having a load connecting member on its free end and having the opposite end connected to said drive nut, said extendable member adapted for axial movement so as to extend out of said body tube;
drive means including an electric drive motor having windings for rotating said drive screw;
the interior surfaces of said body tube assembly and the exterior surfaces of said drive nut configured to provide said reaction surfaces within said body tube assembly at least at corner portions of said drive nut and to provide open spaces between the outer surfaces of said drive nut and the interior surfaces of said body tube assembly other than at said reaction surfaces, substantially each corner portion having plural surfaces engaging corresponding reaction surfaces of the body tube assembly.

21. A linear actuator according to claim 20, wherein said drive nut is substantially square sided.

22. A linear actuator according to claim 21, wherein said body tube assembly is configured to provide open spaces between the outer surfaces of said square sided drive nut and the interior surfaces of said body tube assembly except for the corner portions of said drive nut.

23. A linear actuator according to claim 20, wherein a limit switch assembly is attached to said actuator housing and is adapted for operation by movement of said drive means, said switch assembly adapted for controlling operation of electric power switches for disengaging said electric drive motor when said extendable member reaches predetermined positions.

24. A linear actuator according to claim 20, wherein an overload controller means is provided for providing a second level of position control in an overload mode, said controller means having a thermal sensing element located in the windings of said electric motor, said controller means operable for interrupting power to said electric motor upon heat up of said motor windings beyond a predetermined temperature.

25. A linear actuator according to claim 23, wherein said limit switch assembly contains a position monitoring means operated by said drive means which is adapted for generating an electric signal proportional to the position of said extendable member.

26. A linear actuator according to claim 25, wherein said position monitoring means comprises a potentiometer.

* * * * *